US012694470B2

(12) United States Patent
Wang et al.

(10) Patent No.: US 12,694,470 B2
(45) Date of Patent: Jul. 28, 2026

(54) METHOD FOR INVOKING PANORAMIC PICTURE, AND PANORAMIC CAMERA SYSTEM

(71) Applicant: Labpano Technology (Changzhou) Co., Ltd., Jiansgu (CN)

(72) Inventors: Shibo Wang, Jiansgu (CN); Jingcheng Shen, Jiansgu (CN); Shusen Lin, Jiansgu (CN); Canxin Wu, Jiansgu (CN)

(73) Assignee: LABPANO TECHNOLOGY (CHANGZHOU) CO., LTD., Changzhou (CN)

( * ) Notice: Subject to any disclaimer, the term of this patent is extended or adjusted under 35 U.S.C. 154(b) by 351 days.

(21) Appl. No.: 18/588,963

(22) Filed: Feb. 27, 2024

(65) Prior Publication Data

US 2024/0303769 A1 Sep. 12, 2024

(30) Foreign Application Priority Data

Mar. 8, 2023 (CN) .......................... 202310220607.X

(51) Int. Cl.
*G06T 3/4038* (2024.01)
*G06T 7/70* (2017.01)
*H04N 23/698* (2023.01)

(52) U.S. Cl.
CPC .............. *G06T 3/4038* (2013.01); *G06T 7/70* (2017.01); *H04N 23/698* (2023.01)

(58) Field of Classification Search
CPC ....... G06T 3/4038; G06T 7/70; G06T 19/006;

G06T 2207/10016; G06T 3/12; G06T 2207/20221; G06T 7/80; G06T 2207/20084; G06T 5/80; G06T 7/73; G06T 3/047; H04N 23/698; H04N 5/2224; H04N 13/243; H04N 23/90; H04N 23/60; H04N 23/661; H04N 13/194; H04N 23/45; H04N 7/181
See application file for complete search history.

(56) References Cited

U.S. PATENT DOCUMENTS

| | | | | | |
|---|---|---|---|---|---|
| 10,523,866 | B2 * | 12/2019 | Zhao | .......................... | G06T 7/80 |
| 12,148,122 | B2 * | 11/2024 | Yang | ..................... | G06T 3/4038 |
| 12,243,254 | B2 * | 3/2025 | Zeng | .......................... | G06T 7/70 |
| 2009/0058990 | A1 * | 3/2009 | Kim | ..................... | G03B 37/02 |
| | | | | | 348/36 |
| 2011/0069147 | A1 * | 3/2011 | Lin | ..................... | H04N 19/597 |
| | | | | | 348/E7.001 |

(Continued)

*Primary Examiner* — Michael S Osinski
(74) *Attorney, Agent, or Firm* — CANTOR COLBURN LLP

(57) ABSTRACT

The present application provides a method for invoking a panoramic picture, and a panoramic camera system. The method includes steps of: collecting multiple camera pictures; unfolding and stitching the collected multiple camera pictures to obtain the panoramic picture; mapping the panoramic picture into a target sphere model to obtain a panoramic sphere picture; and creating a virtual camera, where a third-party application is enabled to directly invoke the virtual camera to obtain the panoramic picture. The present application can facilitate the third-party application to directly invoke the panoramic picture in the panoramic camera system.

20 Claims, 3 Drawing Sheets

(56)        References Cited

U.S. PATENT DOCUMENTS

| 2013/0016181 A1* | 1/2013 | Penner | H04N 23/698 |
| | | | 348/E7.001 |
| 2013/0243351 A1* | 9/2013 | Feng | G06T 3/12 |
| | | | 382/284 |
| 2014/0340427 A1* | 11/2014 | Baker | G06T 5/50 |
| | | | 345/641 |
| 2014/0368609 A1* | 12/2014 | Chang | H04N 23/698 |
| | | | 348/38 |
| 2015/0138311 A1* | 5/2015 | Towndrow | H04N 23/698 |
| | | | 348/36 |
| 2017/0318275 A1* | 11/2017 | Khalid | H04N 23/698 |
| 2017/0330365 A1* | 11/2017 | Adamov | H04L 67/10 |
| 2018/0122042 A1* | 5/2018 | Kim | H04N 5/2628 |
| 2018/0364801 A1* | 12/2018 | Kim | G06T 15/205 |
| 2019/0011826 A1* | 1/2019 | Mu | G03B 37/04 |
| 2019/0052858 A1* | 2/2019 | Yip | H04N 13/161 |
| 2019/0166309 A1* | 5/2019 | Ho | H04N 23/698 |
| 2021/0374994 A1* | 12/2021 | Lu | G01S 5/16 |
| 2022/0385810 A1* | 12/2022 | Pan | H04N 23/698 |
| 2023/0252653 A1* | 8/2023 | Stuurman | G06T 7/292 |
| | | | 382/103 |
| 2023/0283906 A1* | 9/2023 | Liu | H04N 23/698 |
| | | | 348/148 |
| 2023/0351692 A1* | 11/2023 | Mano | G06V 10/761 |
| 2023/0360338 A1* | 11/2023 | Mao | H04N 23/695 |
| 2024/0348766 A1* | 10/2024 | Wu | H04N 9/3141 |
| 2024/0348928 A1* | 10/2024 | Wan | H04N 23/635 |
| 2025/0008165 A1* | 1/2025 | Makiguchi | H04N 23/698 |
| 2025/0029322 A1* | 1/2025 | Liu | G06V 10/82 |
| 2025/0209567 A1* | 6/2025 | Lin | G06T 19/00 |
| 2026/0004393 A1* | 1/2026 | Xu | G06T 3/4038 |

* cited by examiner

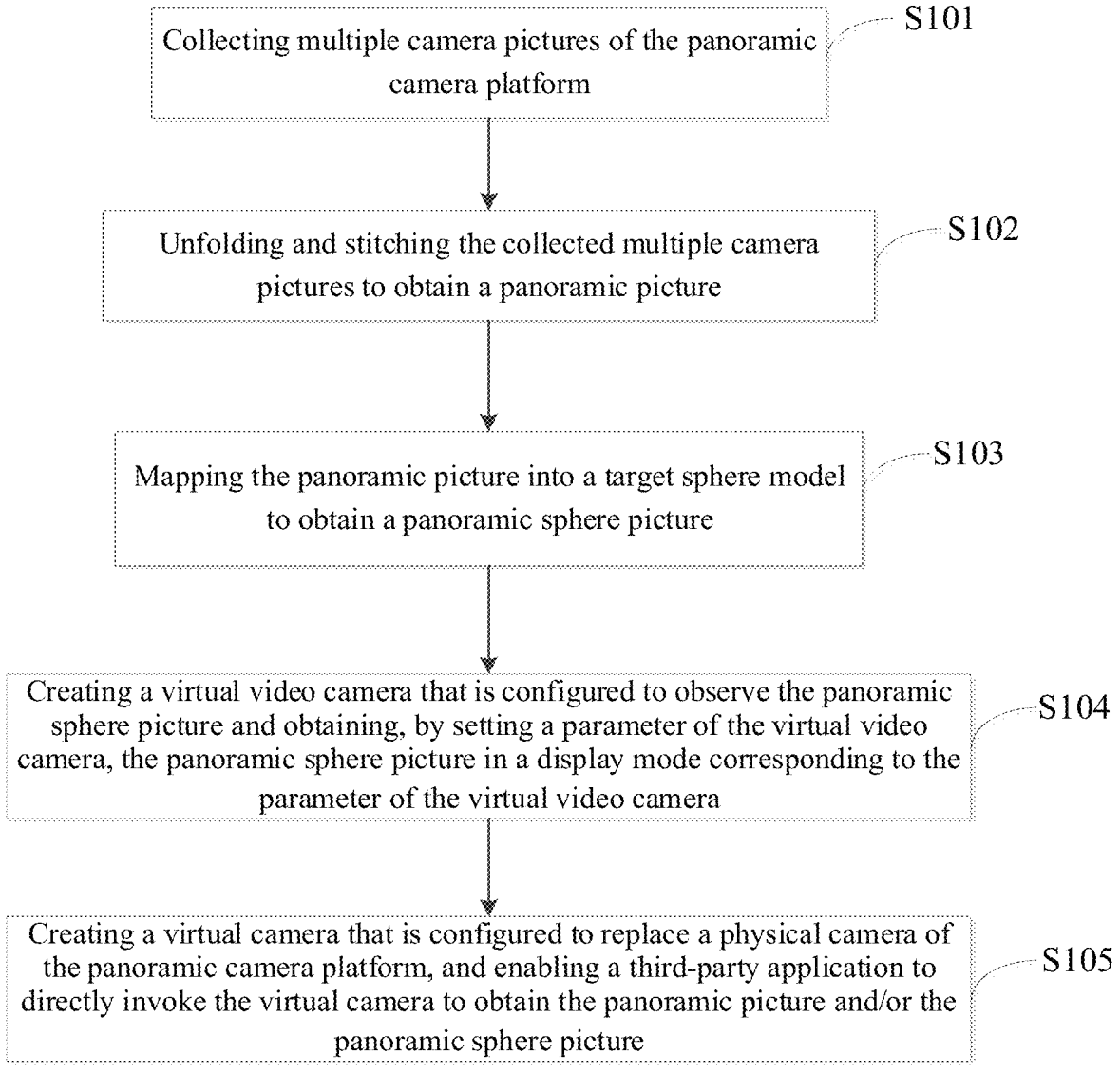

Collecting multiple camera pictures of the panoramic camera platform — S101

Unfolding and stitching the collected multiple camera pictures to obtain a panoramic picture — S102

Mapping the panoramic picture into a target sphere model to obtain a panoramic sphere picture — S103

Creating a virtual video camera that is configured to observe the panoramic sphere picture and obtaining, by setting a parameter of the virtual video camera, the panoramic sphere picture in a display mode corresponding to the parameter of the virtual video camera — S104

Creating a virtual camera that is configured to replace a physical camera of the panoramic camera platform, and enabling a third-party application to directly invoke the virtual camera to obtain the panoramic picture and/or the panoramic sphere picture — S105

FIG. 1

METHOD FOR INVOKING PANORAMIC PICTURE, AND PANORAMIC CAMERA SYSTEM

CROSS-REFERENCE TO RELATED APPLICATION

Pursuant to 35 U.S.C. § 119 and the Paris Convention, this application claims the benefit of Chinese Patent Application No. 202310220607.X filed on Mar. 8, 2023, the content of which is incorporated herein by reference.

TECHNICAL FIELD

The present application relates to the field of image processing technology, and in particular, to a method for invoking a panoramic picture, and a panoramic camera system.

BACKGROUND

The statements provided herein are merely background information related to the present application, and do not necessarily constitute any prior arts. Panoramic video is a dynamic video shot by a panoramic camera device and contains 360-degree all-round picture contents. The panoramic camera device usually consists of one or more fish-eye cameras, and a panoramic stitching is performed on the static pictures of multiple angles taken by all fish-eye cameras to form a 360-degree panoramic picture, and then these static panoramic pictures are converted into dynamic video images, thereby enabling a user to watch the dynamic video captured on the panoramic camera device at any angle.

In recent years, with the widespread promotion and use of third-party applications such as Tiktok and Wechat, the use of third-party applications on panoramic cameras has also increased, thus greatly improving the use scenarios of panoramic cameras. However, the current third-party applications installed on the panoramic camera can only invoke pictures of a certain lens of the panoramic camera without any image processing, such as a panoramic stitching, an anti-shake mode, an AI (artificial intelligence) tracking and recognition, etc., that are performed by the panoramic camera system, as a result, these widely-used third-party applications cannot be better used on panoramic cameras, which greatly limits the application scope of panoramic cameras.

SUMMARY

Embodiments of the present application provide a method for invoking a panoramic picture, a panoramic camera system, a readable storage medium and a computer device. The technical problem to be solved is aimed at the defects in the existing technology, where a third-party application installed on a camera can only invoke pictures of a certain lens of a panoramic camera without any image processing, such as the panoramic stitching, the anti-shake mode, the AI tracking and recognition, etc., performed by the panoramic camera system.

To solve the above technical problem, one technical solution adopted by the present application is to provide a method for invoking a panoramic picture, which includes the following steps S101, S102, S103, S104 and S105.

In step S101, multiple camera pictures are collected from a panoramic camera platform.

In step S102, the collected multiple camera pictures are unfolded and stitched to obtain the panoramic picture.

In step S103, the panoramic picture is mapped into a target sphere model to obtain the panoramic sphere picture.

In step S104, a virtual video camera is created, the virtual video camera is configured to observe the panoramic sphere picture, and is enabled to obtain by setting a parameter of the virtual video camera, the panoramic sphere picture in a display mode corresponding to the parameter of the virtual video camera.

In step S105, a virtual camera is created, the virtual camera is configured to replace a physical camera of the panoramic camera platform, and a third-party application is enabled to directly invoke the virtual camera to obtain the panoramic picture and/or the panoramic sphere picture.

In a specific implementation, in the step S104, the panoramic sphere picture in a corresponding display mode includes a panoramic sphere picture in an immersive mode, or a panoramic sphere picture in an asteroid mode.

In a specific implementation, the panoramic camera platform includes an inertial measurement unit, and the step S102 also includes the following steps: obtaining data from the inertial measurement unit; obtaining by calculation a current posture of the panoramic camera platform according to the data of the inertial measurement unit; and correcting the panoramic picture according to the current posture of the panoramic camera platform.

In a specific implementation, the step S102 also includes steps of: detecting and recognizing a target object in the panoramic picture; and recognizing a position of the target object in the panoramic picture.

In a specific implementation, the step S104 also includes a step of: adjusting the parameter of the virtual video camera according to the position of the target object in the panoramic picture, so that the target object is always located in the middle of the panoramic sphere picture.

In accordance with another aspect of the present application, a panoramic camera system is also provided, having a third-party application being installed. The panoramic camera system includes: a collection module, a processing module, a mapping module, a virtual video camera module and an invoking module.

The collection module is configured to collect multiple camera pictures of the panoramic camera system.

The processing module is configured to unfold and stitch the collected multiple camera pictures to obtain a panoramic picture;

The mapping module is configured to map the panoramic picture into a target sphere model to obtain a panoramic sphere picture;

The virtual video camera module is configured to create a virtual video camera. The virtual video camera is configured to observe the panoramic sphere picture in the target sphere model and is enabled to obtain, by setting a parameter of the virtual video camera, the panoramic sphere picture in a display mode corresponding to the parameter of the virtual video camera.

The third-party application is enabled to directly invoke, by means of the invoking module, the panoramic picture obtained by the processing module and/or the panoramic sphere picture obtained by the virtual video camera module.

In a specific implementation, the third-party application is provided with a layer user interaction interface, and the user interaction interface is used to control the parameter of the virtual video camera in the virtual video camera module, to enable the third-party application to obtain panoramic sphere pictures in different modes.

In a specific implementation, the invoking module of the panoramic camera system includes a virtual camera, and the third-party application obtains the panoramic sphere picture by invoking the virtual camera.

In accordance with yet another aspect of the present application, a computer-readable storage medium is also provided, and the computer-readable storage medium stores a computer program. When the computer program is executed by a processor, the steps described in the above method for invoking a panoramic picture are implemented, or the panoramic camera system as above described is enabled.

In accordance with further another aspect of the present application, a computer device is also provided, which includes: one or more processors; a memory; and one or more computer programs. The processor and the memory are connected by a bus, where the one or more computer programs are stored in the memory and configured to be executed by the one or more processors. The processor when executing the computer program, is configured to implement the steps described in the above method for invoking the panoramic picture or the above panoramic camera system.

Beneficial effects of the present application are that: distinguished from situations in the prior arts, the embodiments of the present application provide a method for invoking a panoramic picture and a panoramic camera system. The method for invoking the panoramic picture includes the following steps S101, S102, S103, S104 and S105.

In step S101, multiple camera pictures are collected from a panoramic camera platform.

In step S102, the collected multiple camera pictures are unfolded and stitched to obtain the panoramic picture.

In step S103, the panoramic picture is mapped into a target sphere model to obtain the panoramic sphere picture.

In step S104, a virtual video camera is created, the virtual video camera is configured to observe the panoramic sphere picture and is enabled to obtain, by setting a parameter of the virtual video camera, the panoramic sphere picture in a display mode corresponding to the parameter of the virtual video camera.

In step S105, a virtual camera is created, the virtual camera is configured to replace a physical camera of the panoramic camera platform, and a third-party application is enabled to directly invoke the virtual camera to obtain the panoramic picture and/or the panoramic sphere picture.

It can be seen from the above technical solutions that the embodiments of the present application have at least the following advantages:

By means of the target sphere model mapped in the above method for invoking the panoramic picture and the virtual video camera, the third-party application of the present application is enabled to directly obtain the panoramic picture stitched by the panoramic camera system in the target sphere model or the panoramic sphere picture obtained after a processing of the panoramic picture, including the panoramic sphere picture in different display modes, such as the panoramic picture in the immersive mode, the panoramic picture in the asteroid mode, and the panoramic picture after the anti-shake mode processing and the AI tracking and recognition by the panoramic camera platform. The third-party application can directly use the obtained panoramic picture and/or the obtained panoramic sphere picture to record, live broadcast or make video calls, etc., which greatly improves the application scope and usage scenarios of the panoramic camera platform.

BRIEF DESCRIPTION OF DRAWINGS

In order to illustrate the technical solutions in the embodiments of the present application more clearly, the drawings that need to be used in the description of the embodiments will be briefly introduced below. Obviously, the drawings in the following description are only some embodiments of the present application. For persons of ordinary skill in the art, other drawings may also be obtained based on these drawings without exerting creative efforts.

Figure 2:
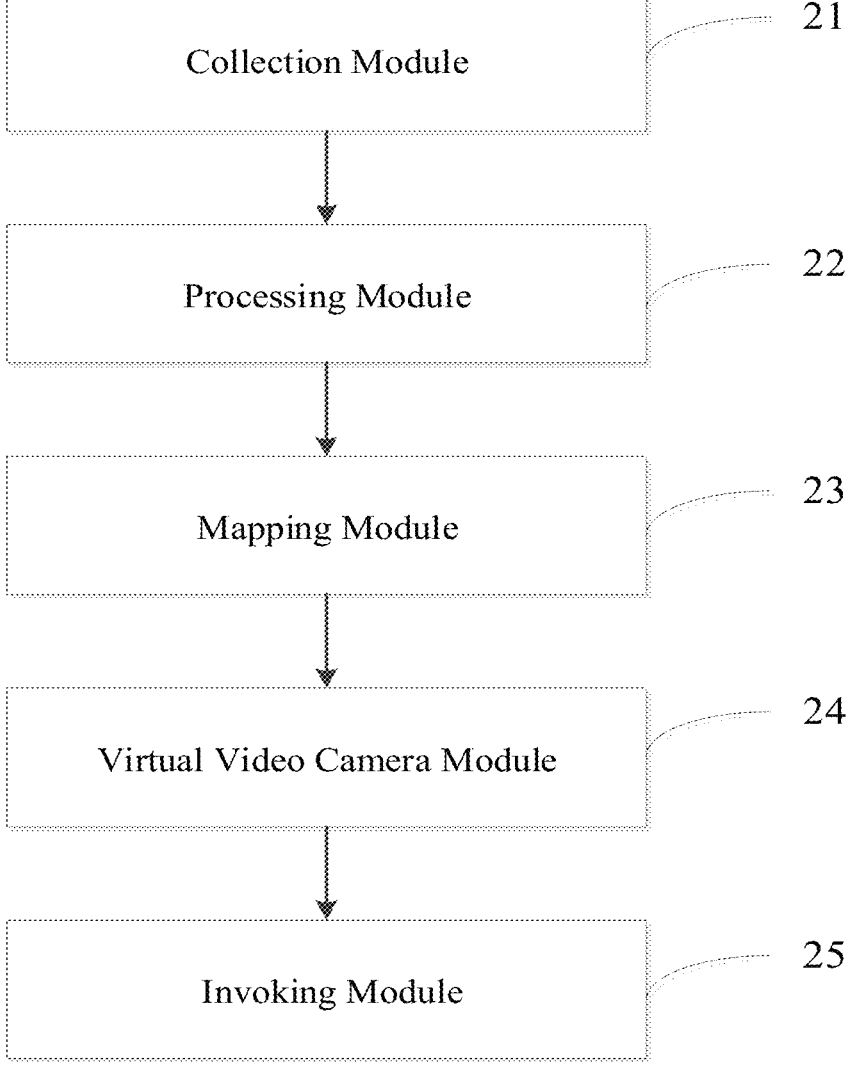
Figure 3:
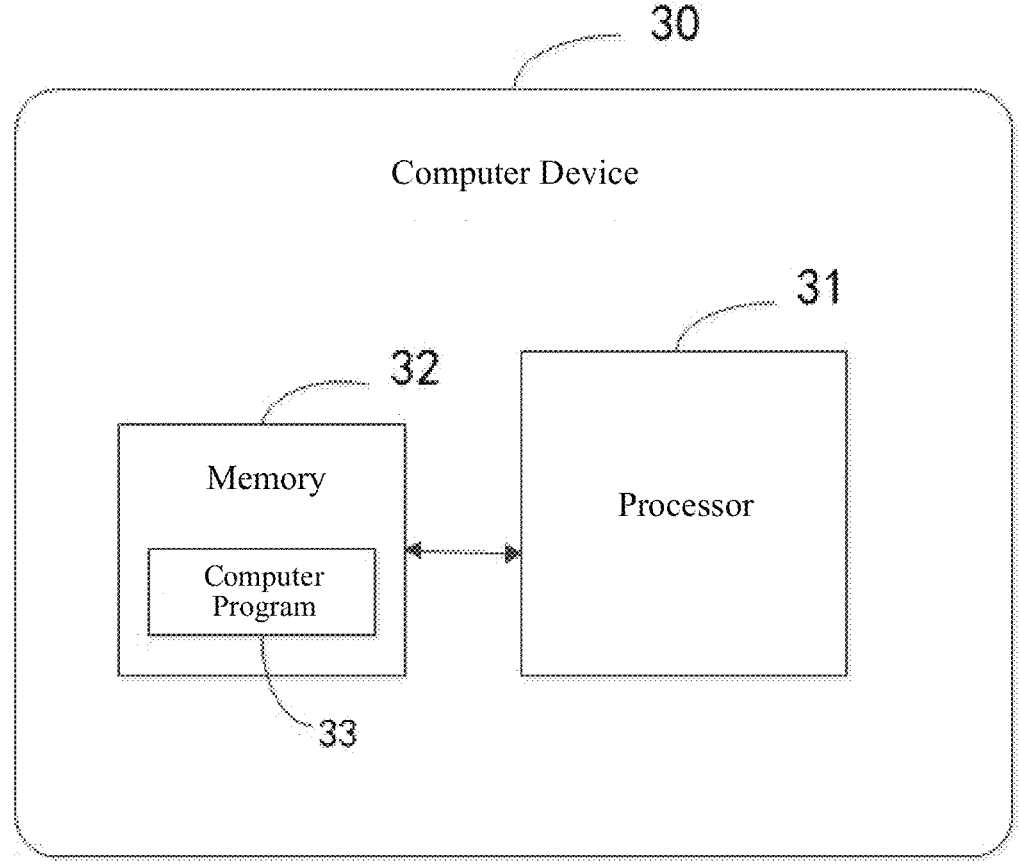

FIG. 1 is a schematic flow chart of an implementation of a method for invoking a panoramic picture provided by an embodiment of the present application;

FIG. 2 is a schematic structural diagram of a panoramic camera system provided by an embodiment of the present application; and FIG. 3 is a schematic structural diagram of a computer device provided by an embodiment of the present application.

DETAILED DESCRIPTION OF EMBODIMENTS

The present application will be described in further detail below with reference to the drawings and embodiments. It is particularly pointed out that the following embodiments are used only to illustrate the present application instead of limiting the scope of the present application. Similarly, the following embodiments are only some, not all, of the embodiments of the present application. Other embodiments obtained by persons of ordinary skill in the art without exerting creative efforts all fall within the protection scope of the present application.

The terms "including" and "having" and any variations thereof in this application are intended to cover a non-exclusive inclusion. For example, a process, method, system, product or device that includes a series of steps or units is not limited to the listed steps or units, but optionally also includes unlisted steps or units, or optionally also includes other steps or units that are inherent to such process, method, product, or device.

The above terms are only intended for convenience of description and should not be understood as limitations on technical solutions of the present application.

Reference herein to "an embodiment" means that a particular feature, structure or characteristic described in connection with the embodiment may be included in at least one embodiment of the present application. The appearances of the wording "embodiment" in various places in the specification are not necessarily all referring to the same embodiment, nor are referring to separate or alternative embodiments mutually exclusive of other embodiments. It is understood, both explicitly and implicitly, by persons skilled in the art that the embodiments described herein may be combined with other embodiments.

Specific implementations of the present application are described in detail below with reference to specific embodiments:

FIG. 1 shows an implementation process of a method for invoking a panoramic picture provided by an embodiment of the present application. For convenience of explanation, only the parts related to the embodiment of the present application are shown. The details are as follows:

In step S101, multiple camera pictures are collected from a panoramic camera platform.

In the embodiment of the present application, the method is suitable for a panoramic camera system or platform, and through multiple fish-eye cameras, a 360° panoramic picture is obtained.

In step S102, the collected multiple camera pictures are unfolded and stitched to obtain the panoramic picture.

In the embodiment of the present application, the multiple camera pictures collected in step S101 are processed by the panoramic camera system through algorithms, including that various camera pictures are unfolded and stitched to obtain a well-stitched panoramic picture. The panoramic picture is usually an Equirectangular Projection.

Further, the method also includes an anti-shake processing of the panoramic picture. Particularly, the panoramic camera platform also includes an inertial measurement unit, and the inertial measurement unit includes a gyroscope and an accelerometer. The panoramic camera system obtains data from the inertial measurement unit, including data collected by the gyroscope and data collected by the accelerometer, obtains a current posture of the panoramic camera platform through calculation, and corrects a picture image of the panoramic camera platform according to the current posture of the panoramic camera platform, so that the picture image of panoramic camera platform can remain stable in case that the panoramic camera platform moves or rotates.

Further, the method also includes an intelligent AI tracking and recognition of the panoramic picture. Particularly, an AI detection and recognition is performed through algorithms on a target object in the panoramic picture. The algorithms used here include but are not limited to the SSD (Single Shot MultiBox Detector) algorithm, R-CNN (Region-Convolutional Neural Networks) series algorithm and YOLO (You Only Look Once) series algorithm, etc., in deep learning. The recognized target object may be a dynamic object such as a person, an animal and a vehicle, or a static object such as a tree, a flower and a building. The position of the target object in the panoramic picture is calculated according to the detected and recognized target object, and the parameter(s) of the virtual video camera in step S104 is (are) adjusted according to the calculated position information, so that the target object is always kept in the middle of a panoramic sphere picture obtained in step S104, and then the effect of AI tracking and recognition is achieved.

In step S103, the panoramic picture is mapped into a target sphere model to obtain a panoramic sphere picture.

In the embodiment of the present application, a virtual layer is created in a panoramic camera system layer, which includes that a target sphere model is created, and the panoramic picture processed by the system in step S102 is mapped and projected into the target sphere model to obtain the panoramic sphere picture.

In step S104, a virtual video camera is created. The virtual video camera is configured to observe the panoramic sphere picture in the target sphere model. The virtual video camera is enabled to obtain the panoramic sphere picture in different display modes by setting the parameter of the virtual video camera.

The virtual video camera is configured to provide a specific viewing angle of the panoramic sphere picture in the target sphere model. By means of the virtual video camera, a user is enabled to select different panoramic sphere picture display modes or different panoramic sphere picture viewing angles based on her/his own viewing needs by setting and adjusting the parameter of the virtual video camera.

Further, in a specific implementation, the panoramic sphere pictures in different display modes obtained by the virtual video camera include the panoramic sphere picture in an immersive mode, or a panoramic sphere picture in an asteroid mode. The panoramic sphere picture in the immersive mode is a panoramic picture having a three-dimensional immersive effect from a first perspective. The panoramic sphere picture in asteroid mode is a panoramic picture that has been processed by special effects to have a bird's-eye view of a miniature planet.

Further, in a specific implementation, by means of the AI tracking and recognition, the position of the target object in the panoramic picture is calculated based on the target object that has been detected and recognized, and the parameter(s) of the virtual video camera is adjusted according to the position, and then the viewing angle of the panoramic sphere picture obtained by the virtual video camera is adjusted, so that the target object is always located in the middle of the panoramic sphere picture obtained by the virtual video camera.

In step S105, a virtual camera is created. The virtual camera is configured to replace a physical camera of the panoramic camera platform. The virtual camera is directly invokable by a third-party application to obtain the panoramic picture and/or the panoramic sphere picture.

The virtual camera is configured to replace the physical camera of the panoramic camera platform, which is equivalent to the physical camera on the back of the mobile phone. The third-party application is an application not officially developed by the panoramic camera system, such as WeChat, Tiktok, etc. When the third-party application is in running, the camera invoked by the third-party application is the virtual camera. By invoking the virtual camera, the third-party application is enabled to obtain the unfolded and stitched panoramic picture, the panoramic sphere picture in different display modes obtained in step S104, and the panoramic picture after an anti-shake mode processing and AI detection and recognition processing.

FIG. 2 shows a structure of a panoramic camera system provided by an embodiment of the present application. For convenience of explanation, only the parts related to the embodiment of the present application are shown. The details are as follows:

The panoramic camera system is installed with a third-party application, and the third-party application is an application not officially developed by the panoramic camera system, such as WeChat, Tiktok, etc. The panoramic camera system also includes: a collection module, a processing module, a mapping module, a virtual video camera module and an invoking module.

The collection module is configured to collect multiple camera pictures of the panoramic camera system.

In the embodiment of the present application, the above structure is suitable for a panoramic camera system or device to obtain a 360° panoramic picture through multiple fish-eye cameras.

The processing module is configured to unfold and stitch the collected multiple camera pictures to obtain a panoramic picture.

In the embodiment of the present application, the multiple camera pictures collected by the collection module are processed by the processing module of the panoramic camera system through algorithms, including that each of the camera pictures are unfolded and stitched to obtain a well-stitched panoramic picture, and the panoramic picture is usually an equirectangular projection.

Further, the processing module also performs an anti-shake processing on the panoramic picture. Particularly, the panoramic camera system also includes an inertial measurement unit. The inertial measurement unit includes a gyroscope and an accelerometer. The processing module of the panoramic camera system obtains data from the inertial measurement unit, including data collected by the gyroscope and data collected by the accelerometer, calculates a current posture of the panoramic camera platform, and corrects a picture image of the panoramic camera platform according to the current posture of the panoramic camera platform, so that the picture image of the panoramic camera platform can remain stable in case that the panoramic camera platform moves or rotates.

Further, the processing module also performs an intelligent AI tracking and recognition on the panoramic picture. Particularly, an AI detection and recognition is performed on a target object in the panoramic picture through algorithms. The algorithms used include but are not limited to the SSD algorithm (Single Shot MultiBox Detector), R-CNN (Region-Convolutional Neural Network) series algorithm and YOLO (You Only Look Once) series algorithm, etc., in deep learning. The recognized target object may be a dynamic object such as a person, an animal and a vehicle, or a static object such as a tree, a flower and a building. The position of the target object in the panoramic picture is calculated according to the detected and recognized target object, and the parameter(s) of the virtual video camera in the virtual video camera module is (are) adjusted according to the calculated position information, so that the target object is always kept in the middle of a panoramic sphere picture at the corresponding angle of view obtained by the virtual video camera in the virtual video camera module, and then the effect of AI tracking and recognition is achieved.

The mapping module is configured to map the panoramic picture into a target sphere model to obtain a panoramic sphere picture.

In the embodiment of the present application, a mapping module is created in a layer of the panoramic camera system, including that a target sphere model is created, and the processed panoramic picture in the processing module is mapped and projected to the target sphere model to obtain the panoramic sphere picture.

The virtual video camera module is configured to create a virtual video camera. The virtual video camera is configured to observe the panoramic sphere picture in the target sphere model. By setting the parameter(s) of the virtual video camera, the panoramic sphere picture in the display mode corresponding to the parameter of the virtual video camera is obtained.

The virtual video camera is configured to provide a specific viewing angle of the panoramic sphere picture. By means of the virtual video camera, a user is enabled to set and adjust the parameter(s) of the virtual video camera according to his/her own viewing needs, and then is enabled to select the panoramic sphere picture in the display mode corresponding to the parameter.

Further, in a specific implementation, the panoramic sphere picture in the display mode under the corresponding parameters obtained by the virtual video camera includes the panoramic sphere picture in an immersive mode and the panoramic sphere picture in an asteroid mode. The panoramic sphere picture in the immersive mode is a panoramic picture having a three-dimensional immersive effect from a first perspective. The panoramic sphere picture in the asteroid mode is a panoramic picture that has been processed by special effects to have a bird's-eye view of a miniature planet.

Further, in a specific implementation, the AI tracking and recognition of the processing module calculates the position of the target object in the panoramic screen based on the detected and recognized target object, adjusts the parameter(s) of the virtual video camera based on the position, and then adjusts the viewing angle of the panoramic sphere picture obtained by the virtual video camera, so that the target object is always located in the middle of the panoramic sphere picture obtained by the virtual video camera.

By means of the invoking module, the third-party application is enabled to directly invoke the panoramic picture obtained by the processing module and/or the panoramic sphere picture obtained by the virtual video camera module.

In a specific implementation, the invoking module of the panoramic camera system includes a virtual camera. The virtual camera serves as a main camera of the panoramic camera system and is equivalent to a back camera of an Android phone.

The panoramic picture and the corresponding panoramic sphere picture obtained by means of the processing module, the virtual layer module and the virtual video camera module are served as the pictures of the virtual camera. By invoking the virtual camera, the different panoramic pictures and/or panoramic sphere pictures are obtained by the third-party application.

In a specific implementation, the third-party application of the panoramic camera system is provided with a layer of user interaction interface (UI). The user interaction interface is configured to facilitate the user, when using the third-party application, to control the parameter(s) of the virtual video camera in the virtual video camera module, to enable the third-party application to obtain panoramic sphere pictures in different modes, such as, panoramic sphere pictures in different display modes, including the panoramic sphere pictures in the immersive mode and the panoramic sphere pictures in the asteroid mode; to determine whether the panoramic sphere picture in the anti-shake processing mode is enabled or not; to determine whether the panoramic sphere picture in the AI tracking detection and recognition mode is enabled or not; and to control the virtual video camera to adjust different panoramic sphere picture viewing angles, etc.

FIG. 3 shows a structure of a computer device provided in an embodiment of the present application. For convenience of explanation, only the parts related to the embodiment of the present application are shown.

The computer device 30 of the embodiment of the present application includes a processor 31, a memory 32, and a computer program 33 stored in the memory 32 and executable by the processor 31. The processor 31, when executing the computer program 33, causes the steps in the method for invoking the panoramic picture, such as steps S101 to S105 shown in FIG. 1 to be implemented. Or alternatively, when the processor 31 when executing the computer program 33, enables the functions of each module of the panoramic camera system, such as the functions of modules 21 to 25 shown in FIG. 2 to be implemented.

In an embodiment of the present application, a computer-readable storage medium is provided. The computer-readable storage medium stores a computer program. When the computer program is executed by a processor, the steps in the method for invoking the panoramic picture, such as, steps S101 to S105 shown in FIG. 1 are implemented. Or alternatively, when the computer program is executed by the processor, the functions of each module of the panoramic camera system, such as the functions of modules 21 to 25 shown in FIG. 2 are implemented.

Being distinguished from situations in the prior arts, the embodiments of the present application provide a method for invoking a panoramic picture and a panoramic camera system. The method for invoking a panoramic picture includes the following steps S101, S102, S103, S104 and S105.

In step S101, multiple camera pictures are collected from a panoramic camera platform.

In step S102, the collected multiple camera pictures are unfolded and stitched to obtain the panoramic picture.

In step S103, the panoramic picture is mapped into a target sphere model to obtain the panoramic sphere picture.

In step S104, a virtual video camera is created, the virtual video camera is configured to observe the panoramic sphere picture and is enabled to obtain, by setting a parameter of the virtual video camera, the panoramic sphere picture in a display mode corresponding to the parameter of the virtual video camera.

In step S105, a virtual camera is created, the virtual camera is configured to replace a physical camera of the panoramic camera platform, and a third-party application is enabled to directly invoke the virtual camera to obtain the panoramic picture and/or the panoramic sphere picture.

By means of the target sphere model mapped in the above method for invoking a panoramic picture and the virtual video camera, the third-party application of the present application is enabled to directly obtain the panoramic picture stitched by the panoramic camera system in the target sphere model or the panoramic sphere picture obtained after a processing of the panoramic picture, including the panoramic sphere picture in different display modes, such as the panoramic picture in the immersive mode, the panoramic picture in the asteroid mode, and the panoramic picture after the anti-shake mode processing and the AI tracking and recognition by the panoramic camera. The third-party application can directly use the obtained panoramic picture and/or the obtained panoramic sphere picture to record, live broadcast or make video calls, etc., which greatly improves the application scope and usage scenarios of the panoramic camera.

It can be clearly understood by persons of ordinary skill in the art that for the convenience and simplicity of description, the specific working processes of the systems, devices and units described above may be referred to the corresponding processes in the foregoing method embodiments, which will not be repeated here.

It should be understood that, in several embodiments provided in the present application, the disclosed systems, devices and methods, may be implemented in other ways. For example, the device embodiments described above are only illustrative. For example, the division of the units is only a logical function division. In actual implementations, other division methods may also be presented, for example, multiple units or components may be combined or may be integrated into another system, or some features may be ignored, or not implemented. On the other hand, the coupling or direct coupling or data interconnection between each other shown or discussed may be an indirect coupling or data interconnection through some interfaces, devices or units, and may be presented in electrical, mechanical or other forms.

The units described as separate components may or may not be physically separated, and the components shown as units may or may not be physical units, that is, these units or components may be located in one place, or may be distributed to multiple network units. Some or all of the units may be selected according to actual needs to achieve the purpose of the solution of this embodiment.

In addition, each functional unit in various embodiments of the present application may be integrated into one processing unit, or each unit may exist physically alone, or two or more units may be integrated into one unit. The above integrated units may be implemented in the form of hardware, or may be in the form of software functional units.

If the integrated unit is implemented in the form of a software functional unit and sold or used as an independent product, the integrated unit may be stored in a computer-readable storage medium. Based on this understanding, the technical solution of the present application in essential is the part that contributes to the existing technology, or all or part of the technical solution may be embodied in the form of a software product. The computer software product is stored in a storage medium, and includes several instructions to cause a computer device (which may be a personal computer, a server, or a network device, etc.) to execute all or part of the steps of the method described in various embodiments of the present application. The aforementioned storage medium includes: U disk, a mobile hard disk, a read-only memory (ROM), a random-access memory (RAM), a magnetic disk or an optical disk and other media that can store program codes.

As mentioned above, the above embodiments are only used to illustrate, instead of limiting, the technical solution of the present application. Although the present application has been described in detail with reference to the foregoing embodiments, persons of ordinary skill in the art should understand that the technical solutions described in each of the foregoing embodiments may be modified, or some technical features thereof may be equivalently substituted. However, such modifications or substitutions do not cause the essence of the corresponding technical solutions to deviate from the spirit and scope of the technical solutions of various embodiments of the present application.

What is claimed is:

1. A method for invoking a panoramic picture, comprising:

collecting multiple camera pictures from a panoramic camera platform;

unfolding and stitching collected multiple camera pictures to obtain the panoramic picture;

mapping the panoramic picture into a target sphere model to obtain a panoramic sphere picture;

creating a virtual video camera that is configured to observe the panoramic sphere picture and obtaining, by setting a parameter of the virtual video camera, the panoramic sphere picture in a display mode corresponding to the parameter of the virtual video camera; and creating a virtual camera that is configured to replace a physical camera of the panoramic camera platform, and enabling a third-party application to directly invoke the virtual camera to obtain the panoramic picture and/or the panoramic sphere picture.

2. The method for invoking the panoramic picture according to claim 1, wherein the panoramic sphere picture in the display mode corresponding to the parameter of the virtual video camera comprises a panoramic sphere picture in an immersive mode, or a panoramic sphere picture in an asteroid mode.

3. The method for invoking the panoramic picture according to claim 2, wherein the panoramic camera platform comprises an inertial measurement unit, and said unfolding and stitching the collected multiple camera pictures to obtain the panoramic picture further comprises:

obtaining data from the inertial measurement unit;

obtaining by calculation, a current posture of the panoramic camera platform according to the data of the inertial measurement unit; and correcting the panoramic picture according to the current posture of the panoramic camera platform.

4. The method for invoking the panoramic picture according to claim 1, wherein said unfolding and stitching the collected multiple camera pictures to obtain the panoramic picture further comprises:

detecting and recognizing a target object in the panoramic picture; and recognizing a position of the target object in the panoramic picture.

5. The method for invoking the panoramic picture according to claim 2, wherein said unfolding and stitching the collected multiple camera pictures to obtain the panoramic picture further comprises:

detecting and recognizing a target object in the panoramic picture; and recognizing a position of the target object in the panoramic picture.

6. The method for invoking the panoramic picture according to claim 3, wherein said unfolding and stitching the collected multiple camera pictures to obtain the panoramic picture further comprises:

detecting and recognizing a target object in the panoramic picture; and recognizing a position of the target object in the panoramic picture.

7. The method for invoking the panoramic picture according to claim 4, wherein said creating the virtual video camera that is configured to observe the panoramic sphere picture and obtaining, by setting the parameter of the virtual video camera, the panoramic sphere picture in the display mode corresponding to the parameter of the virtual video camera further comprises:

adjusting, according to the position of the target object in the panoramic picture, the parameter of the virtual video camera, to enable the target object to be always located in a middle of the panoramic sphere picture.

8. The method for invoking the panoramic picture according to claim 5, wherein said creating the virtual video camera that is configured to observe the panoramic sphere picture and obtaining, by setting the parameter of the virtual video camera, the panoramic sphere picture in the display mode corresponding to the parameter of the virtual video camera further comprises:

adjusting, according to the position of the target object in the panoramic picture, the parameter of the virtual video camera, to enable the target object to be always located in a middle of the panoramic sphere picture.

9. The method for invoking the panoramic picture according to claim 6, wherein said creating the virtual video camera that is configured to observe the panoramic sphere picture and obtaining, by setting the parameter of the virtual video camera, the panoramic sphere picture in the display mode corresponding to the parameter of the virtual video camera further comprises:

adjusting, according to the position of the target object in the panoramic picture, the parameter of the virtual video camera, to enable the target object to be always located in a middle of the panoramic sphere picture.

10. A panoramic camera system, installed with a third-party application, and comprising:

a collection module, configured to collect multiple camera pictures of the panoramic camera system;

a processing module, configured to unfold and stitch collected multiple camera pictures to obtain a panoramic picture;

a mapping module, configured to map the panoramic picture into a target sphere model to obtain a panoramic sphere picture;

a virtual video camera module, configured to create a virtual video camera, wherein the virtual video camera is configured to observe the panoramic sphere picture in the target sphere model, and is enabled to obtain by setting a parameter of the virtual video camera, the panoramic sphere picture in a display mode corresponding to the parameter of the virtual video camera; and an invoking module, wherein the third-party application is enabled to directly invoke, by means of the invoking module, the panoramic picture obtained by the processing module and/or the panoramic sphere picture obtained by the virtual video camera module.

11. The panoramic camera system according to claim 10, wherein the third-party application is provided with a layer of user interaction interface, and the user interaction interface is configured to control the parameter of the virtual video camera in the virtual video camera module, to enable the third-party application to obtain panoramic sphere pictures in different modes.

12. The panoramic camera system according to claim 11, wherein the invoking module of the panoramic camera system comprises a virtual camera, and the third-party application is configured to invoke the virtual camera to obtain the panoramic picture and/or the panoramic sphere picture.

13. A non-transitory computer-readable storage medium, wherein a computer program is stored on the non-transitory computer-readable storage medium, and wherein when the computer program is executed by a processor, steps of the method for invoking the panoramic picture according to claim 1 are implemented.

14. The non-transitory computer-readable storage medium according to claim 13, wherein the panoramic sphere picture in the display mode corresponding to the parameter of the virtual video camera comprises a panoramic sphere picture in an immersive mode, or a panoramic sphere picture in an asteroid mode.

15. The non-transitory computer-readable storage medium according to claim 14, wherein the panoramic camera platform comprises an inertial measurement unit, and said unfolding and stitching the collected multiple camera pictures to obtain the panoramic picture further comprises:

obtaining data from the inertial measurement unit;

obtaining by calculation, a current posture of the panoramic camera platform according to the data of the inertial measurement unit; and correcting the panoramic picture according to the current posture of the panoramic camera platform.

16. The non-transitory computer-readable storage medium according to claim 13, wherein said unfolding and stitching the collected multiple camera pictures to obtain the panoramic picture further comprises:

detecting and recognizing a target object in the panoramic picture; and recognizing a position of the target object in the panoramic picture.

17. The non-transitory computer-readable storage medium according to claim 14, wherein said unfolding and stitching the collected multiple camera pictures to obtain the panoramic picture further comprises:

detecting and recognizing a target object in the panoramic picture; and recognizing a position of the target object in the panoramic picture.

18. The non-transitory computer-readable storage medium according to claim 15, wherein said unfolding and stitching the collected multiple camera pictures to obtain the panoramic picture further comprises:

detecting and recognizing a target object in the panoramic picture; and recognizing a position of the target object in the panoramic picture.

19. The non-transitory computer-readable storage medium according to claim 16, wherein said creating the virtual video camera that is configured to observe the panoramic sphere picture and is enabled to obtain, by setting the parameter of the virtual video camera, the panoramic sphere picture in the display mode corresponding to the parameter of the virtual video camera, further comprises:

adjusting, according to the position of the target object in the panoramic picture, the parameter of the virtual video camera, to enable the target object to always be located in a middle of the panoramic sphere picture.

20. The non-transitory computer-readable storage medium according to claim 17, wherein said creating the virtual video camera that is configured to observe the panoramic sphere picture and is enabled to obtain, by setting the parameter of the virtual video camera, the panoramic sphere picture in the display mode corresponding to the parameter of the virtual video camera, further comprises:

adjusting, according to the position of the target object in the panoramic picture, the parameter of the virtual video camera, to enable the target object to always be located in a middle of the panoramic sphere picture.

\* \* \* \* \*